United States Patent Office 3,030,464
Patented Apr. 17, 1962

3,030,464
DAMPED ANTI-SKID MECHANISM
John M. Zeigler, Hamilton, Ohio, assignor, by mesne assignments, to Burtek, Inc., Tulsa, Okla., a corporation of Delaware
Filed Feb. 23, 1960, Ser. No. 10,217
4 Claims. (Cl. 200—61.46)

This invention relates to braking apparatus and more particularly the invention relates to an anti-skid device for use in conjunction with braking apparatus.

Most anti-skid devices use angular accelerometers as a means of detecting incipient skids. Torsional or angular accelerometers are generally of the following nature: A central shaft has a flywheel or inertia mass rotatably attached but spring loaded to a normal relative angular relationship. In those mechanisms sensitive to deceleration, when the rotative velocity of the shaft suddenly is lowered, the inertia of the flywheel rotatively urges the flywheel against the spring retention. If the inertia of the flywheel overcomes the spring setting, the flywheel assumes a changed angular position in relation to the shaft. This changed position is used in most anti-skid systems to sense an impending skid and to trigger brake release.

As the hydraulic pressure to the brake rises, the retarding torque of the brake increases. This retarding torque may rise to or above the level of the turning torque imparted by the roadway to the tire. As the brake torque rises slightly above this point the wheel will begin to decelerate faster than the rate corresponding to the linear rate of vehicle deceleration. This happens principally because the excessive brake torque is used only to overcome the inertia of braked wheel. Naturally, if the brake pressure continues to rise the rate of wheel deceleration becomes greater until the wheel stops. Even through the torque of the brake is only slightly higher than the original torque of the tire, as the speed differential between the tire and roadway increases the coefficient of friction will decrease because of increased relative motion and the torque of the tire will become substantially less. This in itself causes a constantly increasing rate of deceleration until the wheel stops. Of course, any vehicle moving while one or more of its wheels is locked in skidding. In any event, the angular accelerometer of most anti-skid devices detects angular deceleration of the braked wheel which is of greater magnitude that which linear deceleration of the vehicle, under the best deceleration conditions, could cause. When this excessive angular deceleration is detected the device or system acts to release the brakes until the braked wheel can accelerate to the proper speed.

One difficulty encountered in using this means of skid detection particularly in airplanes is that the nature of the suspension system is such that it causes torsional vibration of the wheel. If the wheel strut is rather long or flexible it will be deflected back several inches on brake application. If the level of braking is high enough to cause skidding, the anti-skid system suddenly releases the brakes. Release of brakes allows the strut to spring forward past its normal position after which the strut vibrates back and forward with its natural frequency. As a strut is fundamentally a beam with a wheel on one end and the other end attached to the aircraft, longitudinal motion of the wheel end produces rotary motion of the wheel. As the strut moves forward the wheel accelerates. With backward motion of the strut the wheel decelerates. The deceleration thus imparted to the wheel is often many times greater than that which is detected in deceleration preceding a skid. Any torsional accelerometer which is sensitive only to deceleration, of course, detects this angular vibration and "thinking" the wheel is skidding releases the brakes. As long as this strut vibration continues the brake release will continue to be triggered falsely resulting in ineffective braking. Indeed, brake releases and reapplication may synchronize with the natural frequency of the strut prolonging the vibration indefinitely, if not aggravating it thereby causing heavy damage.

It has been an objective of the invention to provide an anti-skid device for vehicle brakes, the anti-skid device having means for damping out transitory accelerations, these accelerations being of very short duration so that the accelerometer will be sensitive only to the more prolonged accelerations. The damping means may comprise an eddy current generator, a dash pot, escapement mechanism, or the like interposed between the vehicle wheel and the flywheel.

These and other objectives of the invention will become more readily apparent from the following detailed description taken in conjunction with the accompanying drawings in which:

FIG. 4 is a diagrammatic view of an escapement mechanism in the invention.

Figure 1:
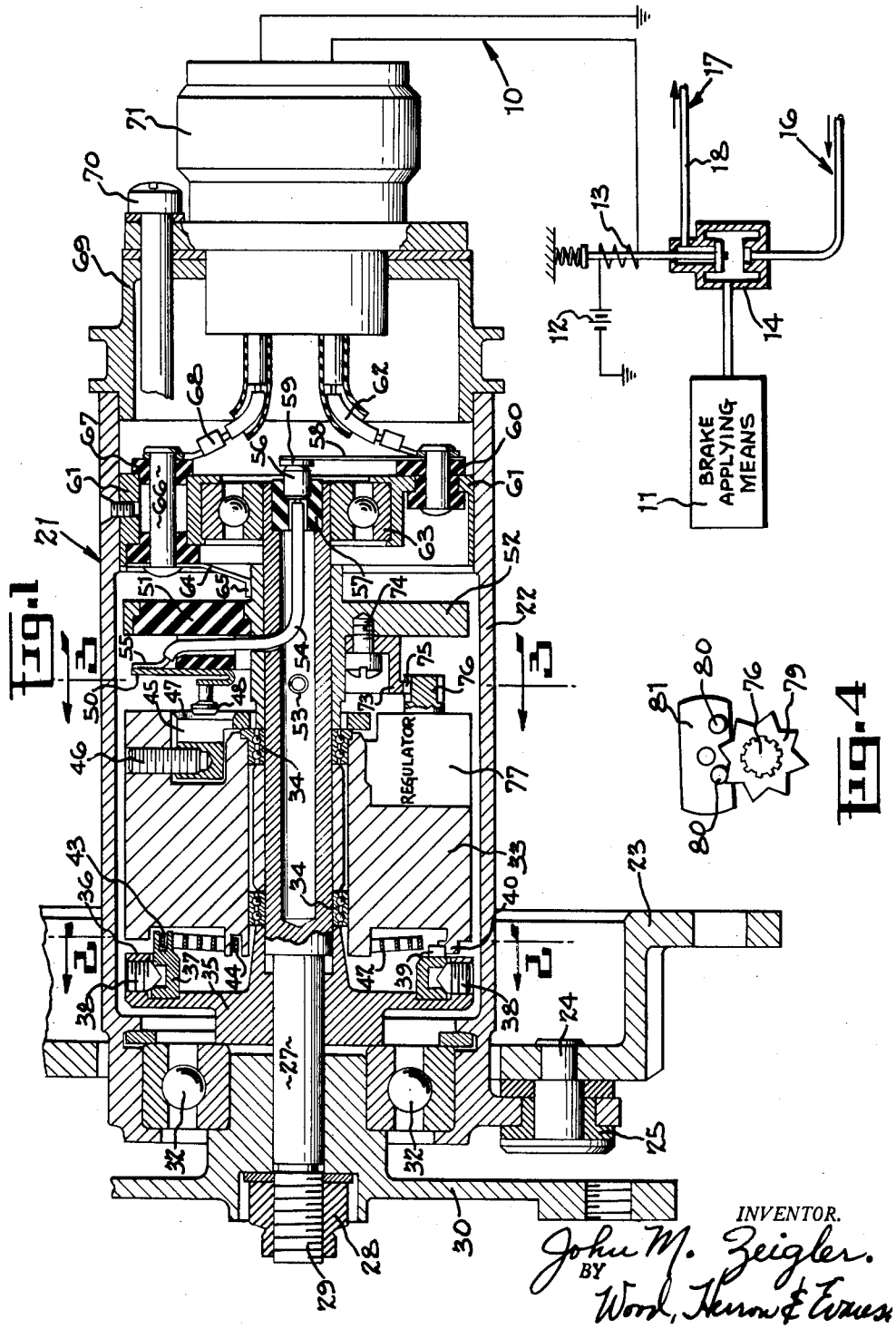
FIG. 1 is a diagrammatic view partly in section showing the invention.
Figure 2:
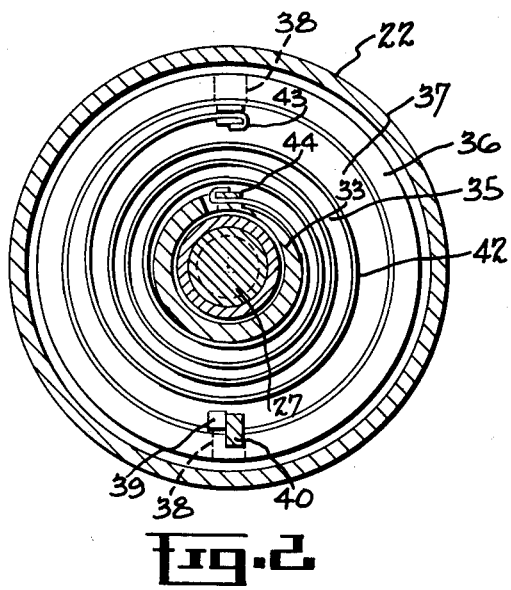
FIG. 2 is a cross sectional view taken along line 2—2 of FIG. 1.

As best illustrated in FIG. 1 the purpose of the invention is to control a circuit indicated at 10, the operation of the circuit causing the release and reapplication of brake applying means indicated at 11. In the diagrammatic form of the invention illustrated, the circuit includes a power supply 12 connected in series with a solenoid 13 which operates a valve 14. The valve 14 is in series with a source of fluid or hydraulic pressure 16 and in its normal position permits the free flow of fluid pressure from the source of fluid pressure to the brake applying means 11. A fluid return 17 is connected in the hydraulic circuit by conduits 18.

The energization of the circuit 10 is controlled by an anti-skid mechanism 21 operatively associated with the wheels of a vehicle, the anti-skid mechanism including a switch to be described below. When the solenoid 13 is energized the valve will be operated to release the pressure in the brake applying means and to prevent further application of pressure to the brake applying means until the solenoid has been de-energized and the valve returned to its normal position.

The primary function of the anti-skid mechanism indicated at 21 in FIG. 1 is to operate the circuit 10 in such a manner as to provide controlled application of brakes, so that braked wheels will be prevented from locking, thus preventing the skid. The mechanism 21 includes a generally cylindrical housing 22 connected to a bracket 23 by means of rivets 24. Vibration reducing bushings 25 are interposed between the housing and the brackets. The bracket 23 is attached to an aircraft wheel strut or a vehicle axle housing or the like.

The housing 22 contains a shaft 27 which is connected by means of a nut 28, on its threaded end 29, to a driver 30. The driver 30 may be connected directly to the vehicle wheel for rotation therewith or may be driven by the vehicle wheel through suitable gearing. The driver 30 is rotatably mounted in the housing 22 by ball bearings 32 which form the principal support for the driver and shaft 27 with respect to the housing. An inertia mass 33 is rotatably mounted on the shaft 27 by means of bearings 34. The inertia mass 33 is driven by the shaft 27 through a plate 35 which has a flange 36 carrying an adjusting ring 37. The ring 37 can be suitably adjusted with respect to the flange 36 and after adjustment is fixed with respect to flange 36 by means of set screws 38. The ring 37 carries a lug 39 which is engaged with a lug 40 carried by the flywheel 33.

A spirally wound torsion spring 42 is connected at its outer end 43 to adjusting ring 37 and at its inner end 44 to the flywheel 33. The torsion spring normally urges the flywheel 33 in such a direction as to bring the lugs 39 and 40 into engagement with each other as shown.

Figure 3:
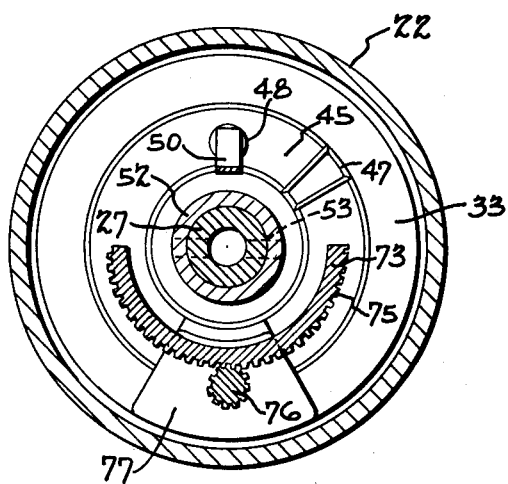
FIG. 3 is a cross sectional view taken along lines 3—3 of FIG. 1.

The flywheel 33 carries a contact plate 45 (FIGS. 1 and 3) which is fixed to the flywheel by means of a set screw 46. The contact plate has a bevelled edge 47 which cooperates with a contact 48. The contact plate 45 and the contact 48 are connected in the circuit 10 in a manner to be described below. As will appear, it is the engagement of the contact 48 with the contact plate 45 which causes the release of the brake applying means through the energization of solenoid 13.

The contact 48 is carried by a conductive leaf spring 50 which is fixed to an insulator 51. The insulator is fixed in a plate 52, the plate being fixed for rotation with shaft 27 by means of a split pin 53. An electrical conductor 54 is connected at one end 55 to the leaf spring 50 and passes through the insulator 51, the hub of plate 52 and the shaft 27. The other end of conductor 54 is connected to a contact 56 which is mounted in the shaft 27 by an insulative bushing 57.

An electrically conductive leaf spring 58 having a brush contact 59 in engagement with the contact 56 is mounted by an insulator 60 to a plate 61 which is in turn fixed in the housing 22 by flat head screws. A conductor 62 connects the spring 58 into the circuit 10. Plate 61 also receives bearings 63 which support the extreme end of shaft 27.

The current flow path for connecting the contact plate 45 to the ground side of the circuit 10 employs the conductivity of the flywheel 33 and utilizes the torsion spring 42 to make an electrical connection of the flywheel 33 through ring 37 and plate 35 to the shaft 27. The shaft 27 is electrically connected to the ground side of circuit 10 through the hub of plate 52 which is in electrical contact with shaft 27, and a leaf spring 64 having one end 65 wiping the hub of plate 52. The other end of the leaf spring 64 is connected to a pin 66 mounted by an insulator 67 to the plate 61. The pin 66 is connected by a lead 68 to ground side of the circuit 10.

The end of the housing 22 through which leads 62 and 68 pass is enclosed by a cap 69 which is fixed to the housing 22 by bolts 70 which are threaded into plate 61. The cap 69 is centrally apertured to receive a fitting 71 having bores through which the conductors 62 and 68 pass.

The plate 52 which is fixed on shaft 27 has a portion of a gear 73 bolted thereto by bolts 74. The gear portion 73 has gear teeth 75 extending through an arc of approximately 180 degrees. The gear teeth 75 are in cooperating engagement with a pinion gear 76. The pinion gear is operably connected to a regulator 77 mounted on flywheel 33. The regulator 77 is a damping mechanism such as an escapement, eddy current generator, dash pot or the like which will limit the angular velocity of pinion gear 76.

It should be appreciated that while, in the form of the invention shown, the damping mechanism and pinion are shown mounted on the flywheel 33, the elements could as well be mounted on the plate 52 with the gear portion 73 being mounted on the flywheel 33. The damping mechanism 77 is diagrammatically illustrated in FIG. 1. A preferred form of the invention would utilize an escapement mechanism illustrated in FIG. 4.

In FIG. 4 an escapement is shown comprising a star gear 79 drivably connected to pinion gear 76, the star gear cooperating with pins 80 fixed on verge 81. The escapement operates in the usual manner with the rotation of the star wheel bringing the teeth thereof alternately into engagement with pins 80 on verge 81, thereby causing the oscillation of the verge 81. The requirement of oscillating the verge 81 limits the angular velocity of the pinion gear 76.

Operation

The invention as described above has particular utility with brakes for aircraft wheels although it is to be understood that the device can be applied to other vehicles as well. In an aircraft landing strut the fore and aft vibration of the landing strut imparts extraordinary acceleration and deceleration rates to the aircraft wheels which adversely influence the operation of known anti-skid mechanisms. This invention with its damping mechanism eliminates the effects of the strut vibrations so that the operation of the anti-skid mechanism is affected only by the more prolonged deceleration and acceleration effects caused by application and release of the brakes.

In operation, as the aircraft wheels touch ground, they are caused to rotate with their engagement with the ground. The shaft 27 is thereby caused to rotate by means of the connection of the driver 30 with the aircraft wheels. Rotation of the shaft 27 brings lug 39 into engagement with lug 40 attached to the flywheel 33 thereby causing the flywheel to rotate with the shaft 27. As the brakes are slowly applied and shaft 27 is slowly decelerated the flywheel 33 will continue to rotate with the shaft because of the spring 42 which urges the flywheel 33 and its lug 40 into engagement with lug 39. However, if the wheels should become overbraked and begin to skid, the rapid deceleration of the wheel would cause shaft 27 and contact 48 which rotates with shaft 27 to decelerate much more rapidly than flywheel 33. The inertia of the flywheel forces an angular movement of the flywheel 33 with respect to the contact 48, the inertia force overriding the force of the spring 42. The relative angular movement of flywheel 33 and plate 21 causes gear portion 73 to move with respect to pinion gear 76 thus causing the rotation of the pinion gear 76. The damping mechanism, as for example an escapement mechanism, limits the rate at which the pinion gear 76 may rotate and thus limits the rate at which the angular displacement of plate 52 (carrying contact 48) occurs with respect to the flywheel 33. A somewhat prolonged deceleration is therefore required before contact 48 moves into engagement with contact plate 45.

Upon engagement of contact 48 with contact 45, solenoid 13 is energized which in turn operates valve 14 to effect the release of the brakes.

When the brakes are released the wheel picks up rotative speed which tends to return flywheel 33 and plate 52 to their normal operating position with the contacts 45 and 48 out of engagement. The escapement mechanism also tends to damp the movement of the elements to their normal position.

By damping the angular movement of the flywheel 33 with respect to the plate 52 and shaft 27 the effects of rapid acceleration and deceleration of a flywheel strut are eliminated.

What is claimed is:

1. Deceleration detecting apparatus comprising a fixed member, a wheel rotatably mounted on said fixed member, a shaft connected for rotation with said wheel, a first electrical contact fixed to said shaft, a flywheel rotatably mounted on said shaft, a spiral spring having one end fixed with respect to said shaft and the other end fixed on said flywheel, said spring urging said flywheel in a first direction, abutment means on said flywheel and shaft blocking said flywheel against movement in said first direction beyond a fixed position, a second electrical contact fixed on said flywheel normally out of engagement with said first contact and engageable with said first electrical contact when said flywheel rotates from said fixed position in a second direction opposite to said first direction, said flywheel being angularly movable with respect to said wheel in said second direction upon rapid deceleration of said wheel to bring said contacts into engagement, a plate fixed on said shaft, gear teeth on said plate, an escapement mechanism on said flywheel, a pinion gear operably connected to said escapement mechanism and meshing with said gear teeth whereby to limit the velocity of said flywheel with respect to said shaft.

2. Deceleration detecting apparatus comprising a fixed member, a wheel rotatably mounted on said fixed member, a shaft connected for rotation with said wheel, a first electrical contact fixed to said shaft, a flywheel rotatably mounted on said shaft, a spiral spring having one end fixed with respect to said shaft and the other end fixed on said flywheel, said spring urging said flywheel in a first direction, abutment means on said flywheel and shaft blocking said flywheel against movement in said first direction beyond a fixed position, a second electrical contact fixed on said flywheel normally out of engagement with said first contact and engageable with said first electrical contact when said flywheel rotates from said fixed position in a second direction opposite to said first direction, said flywheel being angularly movable with respect to said wheel in said second direction upon rapid deceleration of said wheel to bring said contacts into engagement, and angular velocity limiting means interposed between said flywheel and said shaft.

3. Deceleration detecting apparatus comprising a fixed member, a wheel rotatably mounted on said fixed member, a flywheel resiliently connected to said wheel for rotation therewith, said flywheel being angularly movable with respect to said wheel upon rapid deceleration of said wheel, a plate fixed with respect to said wheel adjacent said flywheel, gear teeth on said plate, a pinion gear meshing with said gear teeth, thereby rotating said pinion gear upon angular movement of said flywheel with respect to said wheel, angular velocity limiting means operably connected to said pinion gear, and engageable contacts on said plate and flywheel, said contacts being engageable upon predetermined angular movement of said flywheel with respect to said wheel.

4. Deceleration detecting apparatus comprising a fixed member, a wheel rotatably mounted on said fixed member, a flywheel resiliently connected to said wheel for rotation therewith, said flywheel being angularly movable with respect to said wheel upon rapid deceleration of said wheel, a plate fixed with respect to said wheel, gear teeth on said plate, a pinion gear meshing with said gear teeth thereby rotating said pinion gear upon angular movement between said flywheel and said wheel, and an escapement mechanism fixed to said flywheel and operably connected to said pinion.

References Cited in the file of this patent
UNITED STATES PATENTS

| | | |
|---|---|---|
| 490,249 | Hart | Jan. 17, 1893 |
| 2,061,912 | Logan | Nov. 24, 1936 |
| 2,531,054 | Kelley | Nov. 21, 1950 |
| 2,737,550 | Lucien | Mar. 6, 1956 |
| 2,868,338 | Lucien et al. | Jan. 13, 1959 |
| 2,920,924 | Reswick et al. | Jan. 12, 1960 |